United States Patent [19]
Burgett

[11] Patent Number: 5,507,427
[45] Date of Patent: Apr. 16, 1996

[54] METHOD OF PROVIDING BUILDING PANELS AND BUILDINGS CONSTRUCTED THEREFROM

[76] Inventor: Leo H. Burgett, 4043 Lakeport Blvd., Klamath Falls, Oreg. 97601

[21] Appl. No.: 35,678

[22] Filed: Mar. 23, 1993

[51] Int. Cl.⁶ .............................. B23K 31/02; E04B 1/14; E04G 21/14
[52] U.S. Cl. .................. 228/120; 29/897.32; 29/530; 52/745.19; 264/269; 264/279; 264/279.1; 264/277
[58] Field of Search ...................... 264/259, 267, 264/269, 279, 279.1, 277, 35; 29/897.32, 527.5, 530; 228/120, 182; 52/745.19, 745.2

[56] References Cited

U.S. PATENT DOCUMENTS

| | | | |
|---|---|---|---|
| 1,239,762 | 9/1917 | Benners | 264/279 |
| 2,235,001 | 3/1941 | Allen | 264/279 X |
| 3,913,881 | 10/1975 | Gobler et al. | 264/259 X |
| 4,059,939 | 11/1977 | Elliott | 264/35 X |
| 4,554,124 | 11/1985 | Sudrabin | 264/35 X |
| 4,695,494 | 9/1987 | Fowler, Jr. et al. | |
| 4,729,859 | 3/1988 | Munsey et al. | 264/267 X |
| 5,019,170 | 5/1991 | Walter et al. | |
| 5,055,252 | 10/1991 | Zimmerman | 264/277 X |
| 5,074,095 | 12/1991 | Wilnau | 264/277 X |
| 5,194,206 | 3/1993 | Koch et al. | |
| 5,324,469 | 6/1994 | Walter et al. | |

*Primary Examiner*—Karen Aftergut
*Attorney, Agent, or Firm*—Robert L. Harrington

[57] ABSTRACT

A modular panel formed by solidifying a composite mixture of material within a frame. The panel is suited for use as a structural component and multiple panels are joined together to form structural components such as foundations, floors, walls and roofs. The panels are fixedly joined as by welding the frames of adjacent panels together. The structural components are similarly joined together as by welding to form a building. The material is primarily wood products and has cement, starch and other materials as a binding agent. The material provides a surface that is suited for conventional finishing material. In addition to providing structural integrity, the panels are relatively light in weight, are not subject to deterioration and provide insulating quality.

6 Claims, 4 Drawing Sheets

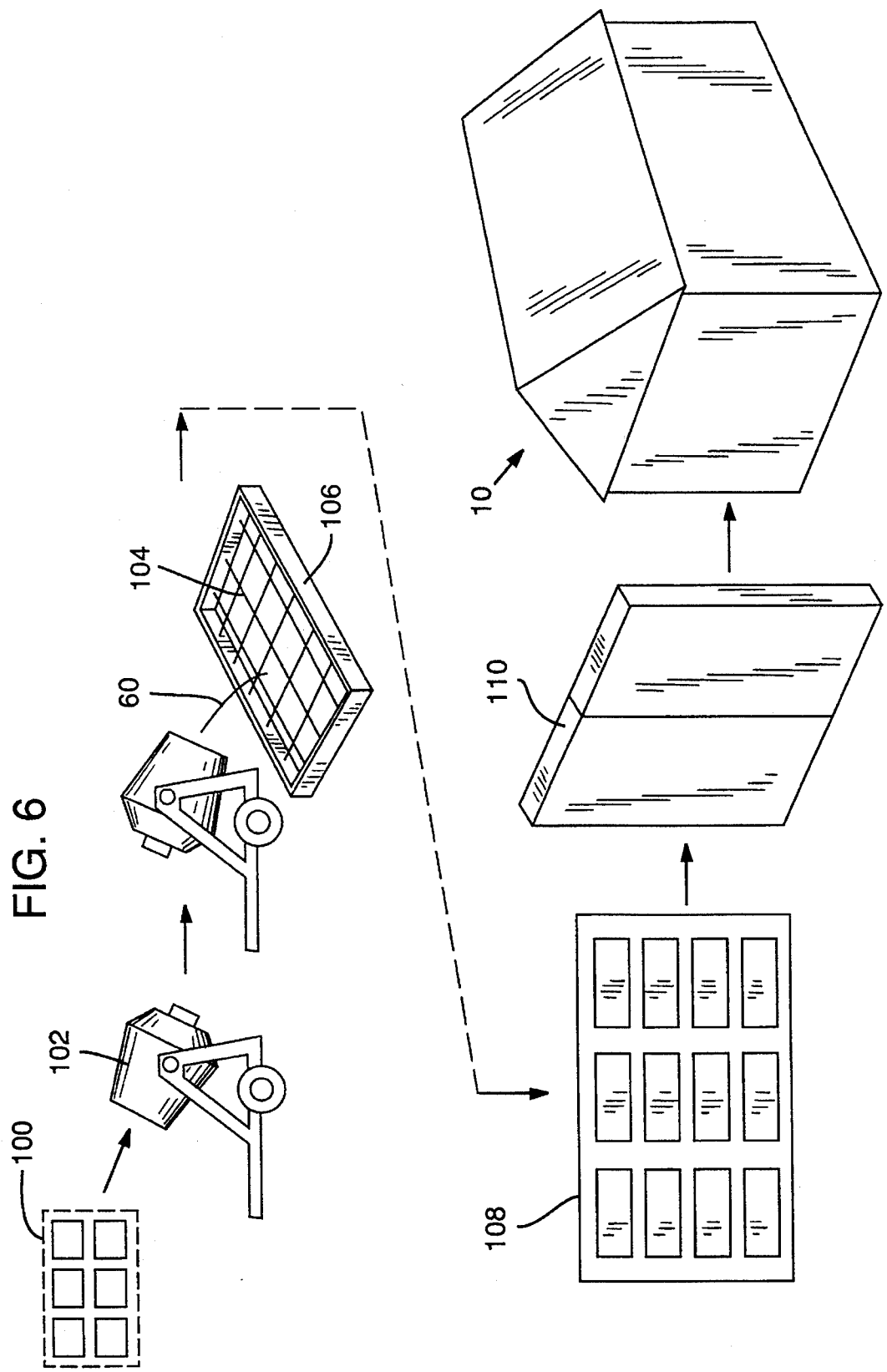

METHOD OF PROVIDING BUILDING PANELS AND BUILDINGS CONSTRUCTED THEREFROM

FIELD OF THE INVENTION

This invention relates to the erection of buildings such as dwellings and particularly relates to buildings erected by assembling modular panels and the method of producing and erecting the panels.

BACKGROUND OF THE INVENTION

Wood frame construction has long been the norm for the erection of buildings such as dwellings. The wood frame construction utilizes dimensional lumber to provide the framework and supporting structure in erecting a building.

The wood frame construction, as its name implies, is in effect an assembly of frames. Walls, ceilings, roofs, floors are all frames of one sort or another. Most often, the frames are erected or fabricated at the dwelling site by skilled carpenters. The frames are joined together to form the framework of a building. The framework of the building is covered on the exposed exterior portion with suitable materials, such as siding on the walls, shingles on the roof and so forth. Similarly the interior of the framework is suitably covered with conventional finishing materials well known in the trade. Insulating material is mounted within the framework, such as between the studs of the walls, between the floor joists of the floor and so forth. The labor to erect a dwelling coupled with the increased cost of the building material has rapidly placed ownership of a home out of reach to many prospective homeowners.

Attempts have been made to lower the cost of housing by producing modular units at a factory and then shipping the units to an erection site. The modular units may be in the form of sections of a building or sections of a structural component such as a wall. In either case, the same wood frame construction is utilized. The savings is generally in labor, since the same materials are utilized.

There is a need for low cost material and method of erecting buildings such as dwellings. The present invention fills that need.

BRIEF SUMMARY OF THE INVENTION

The present invention is a modular structural panel, the method of producing the panel and the method of assembling the panels into structural components to form the structure of a building.

The structural components contemplated herein include foundations, floors walls, including load bearing walls, roofs and the like. The modular panels are joined to form the structural components.

A panel of a preferred embodiment has a metal frame surrounding a solidified mixture of material. Reinforcing members attached to the frame and entrained within the mixture are provided for added strength.

The panels are joined together as by welding to form the structural components of a building. The structural components are in turn fixedly joined as by welding to complete the structure of the building.

The mixture of materials for the panels is selected from a group that is light in weight, provides insulating qualities, has a relatively high strength to weight ratio and is suited for finishing by the addition or application of materials to suit.

The mixture of materials in the preferred embodiment comprises cement, cellulose material such as wood material, starch, alum and water. The materials are mixed with water to form a slurry mixture. The mixture is poured into a mold surrounding the metal frame. The mixture will set up, that is it will solidify and harden. To hasten the curing process the material is placed in a drying unit for a period of time.

The panels are suited to be finished with conventional finishing materials of the trade, such as for example, stucco or siding for the exterior walls, wallboard or plaster for the interior walls and roofing material for the roof. The composition of the material provides for the use of conventional fasteners, such as nails, screw and the like.

The panels may be formed in a desired configuration and may include openings for windows, doorways, vents and the like.

Refer now to the drawings and the detailed description for a complete understanding of the invention.

BRIEF DESCRIPTION OF THE DRAWINGS

FIG. 6 is a schematic illustration of a method of producing the panels and the method of assembling the panels of the present invention together.

DESCRIPTION OF THE PREFERRED EMBODIMENT

Figure 1:
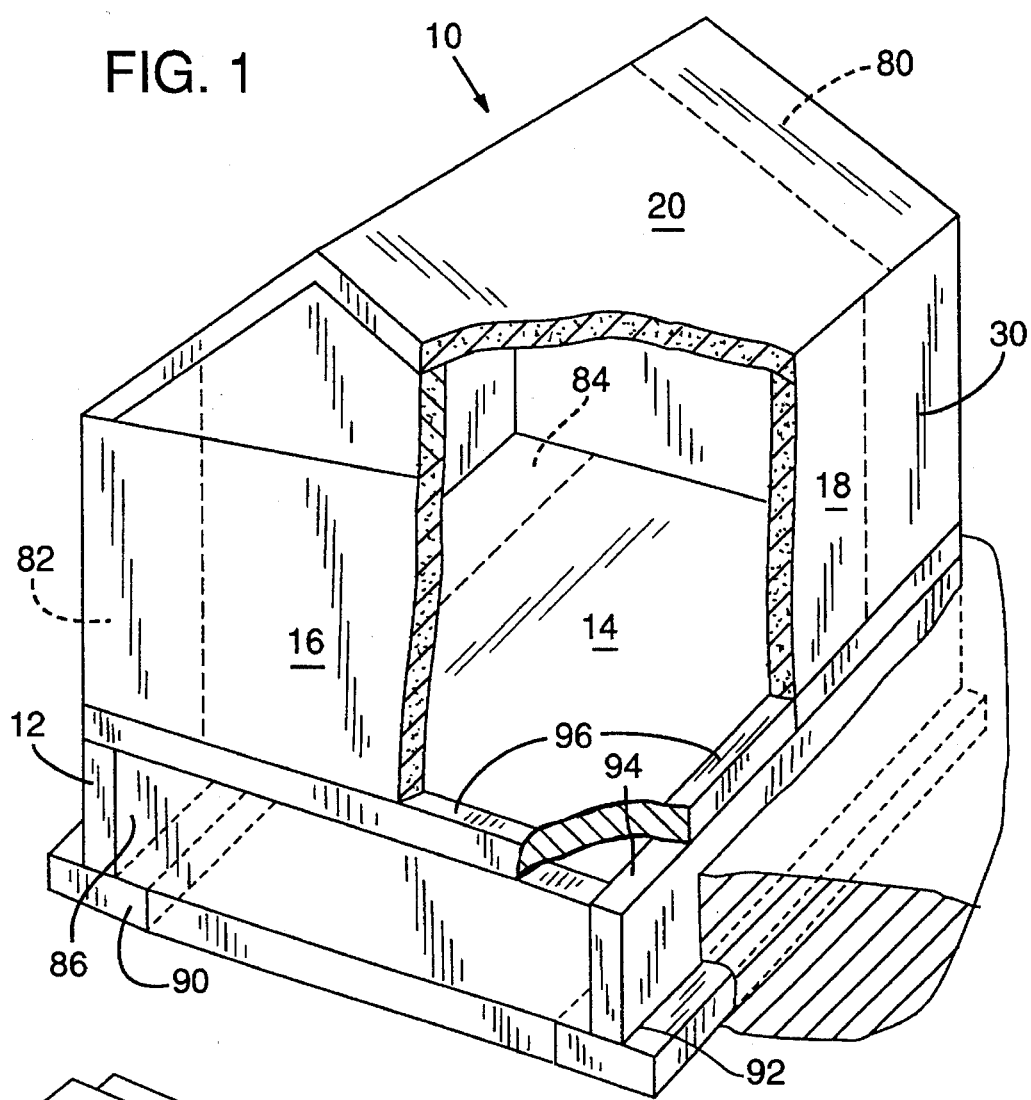
FIG. 1 is a view of a building erected by assembling panels of the present invention together.

Refer now to FIG. 1. Illustrated is a building 10 which is erected by the method of assembling modular panels of the present invention. The building 10 has panels assembled together that serve as structural components of the building. The structural components contemplated herein include foundations, walls, floors, roofs and the like. The panels, which will be described in more detail later, are arranged to be fixedly joined together as by welding. The panels include metal framework to facilitate the joining of the panels. As shown in the figure, the building 10 has multiple panels joined together to form a foundation 12, multiple panels joined together to form a floor 14, multiple panels joined together to form end and side walls 16, 18 and multiple panels joined together to form a roof 20. The structural components are further joined together, that is the foundation 12 is joined to the floor 14, the floor 14 is further joined to the end and side walls 16, 18 and the walls 16, 18 are joined to the roof 20.

Refer now to FIGS. 2a, 2b, 3a, 3b, 3c and 4 of the drawings. These drawings illustrate the method of forming the panels which when assembled form the structural components of the building 10. It will be appreciated that the dimensions and configuration of the panels will vary depending on the intended usage, however the basic forming method is applicable to all. There are expected to be variations in the panel configurations. The wall panels for example will be different for the end walls than for the side walls of the building 10. The end walls are configured to match the pitch of the roof whereas the side walls in most cases will be of the same height. Further some of the panels will have openings provided for doorways, windows, vents and the like.

Figure 2A:
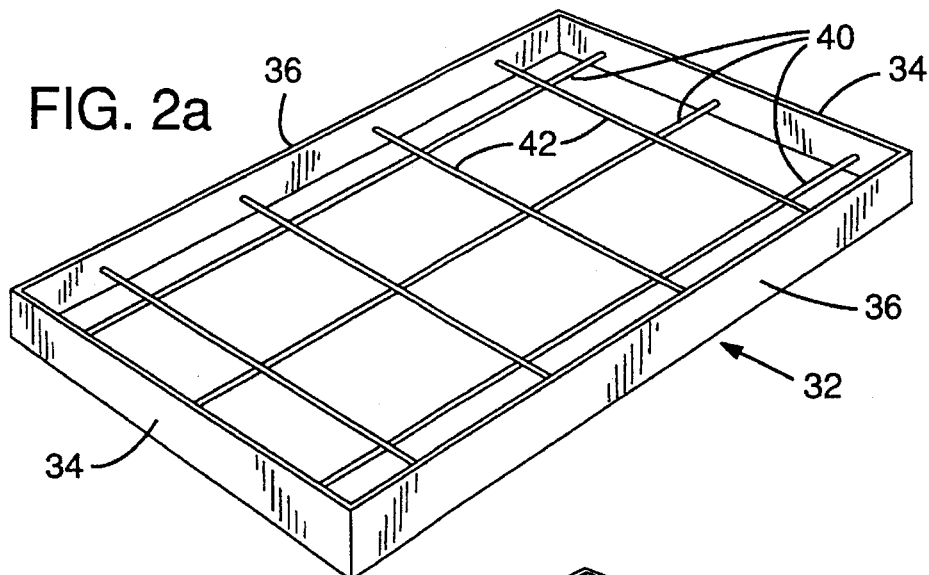
FIGS. 2a and 2b are views of typical frames utilized in the panels of the present invention.
Figure 2B:
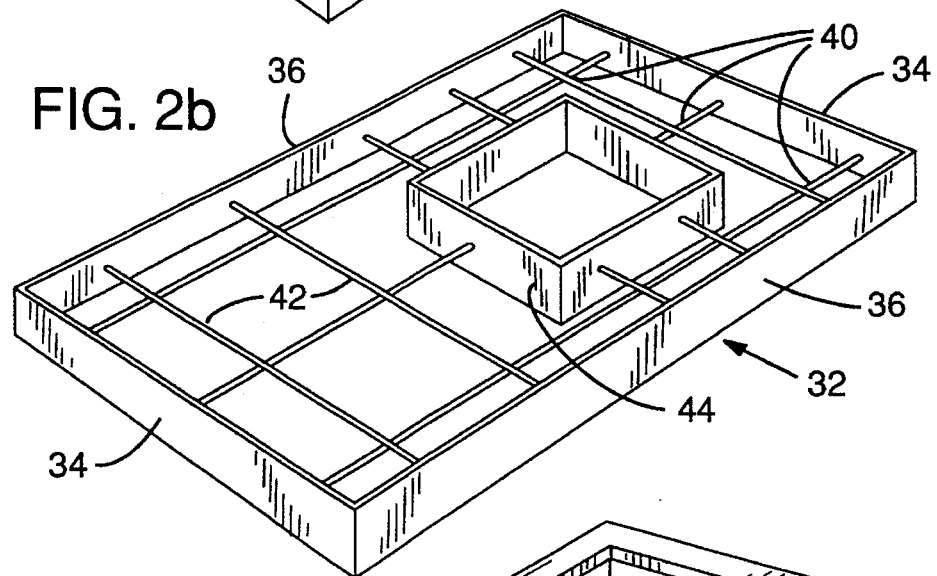

For purposes of illustration, a side wall panel 30 will be illustrated and further described. FIG. 2a illustrates the frame 32 of the panel 30. Basically, the frame 32 is rectangular in shape and is preferably constructed of steel. The frame 32 has opposed ends 34 and opposed sides 36, with the ends 34 and sides 36 being conjoined together to form corners of the frame. Reinforcing members, such as rebar 40 extend from one end 34 to the other end 34 with the rebar being attached to each of the ends 34 as by welding. Rebar 42 extends between and is fixedly attached to sides 36. FIG. 2b illustrates a typical frame 32 for a panel 30 that will have an opening such as a window. A sub frame 44 dimensioned for the size of the desired opening is placed strategically within the frame 32 at the desired position of the opening. Rebar 40 extends from the ends 34 to the frame 44 and rebar 42 extends from the sides 36 to the frame 44.

Figure 3A:
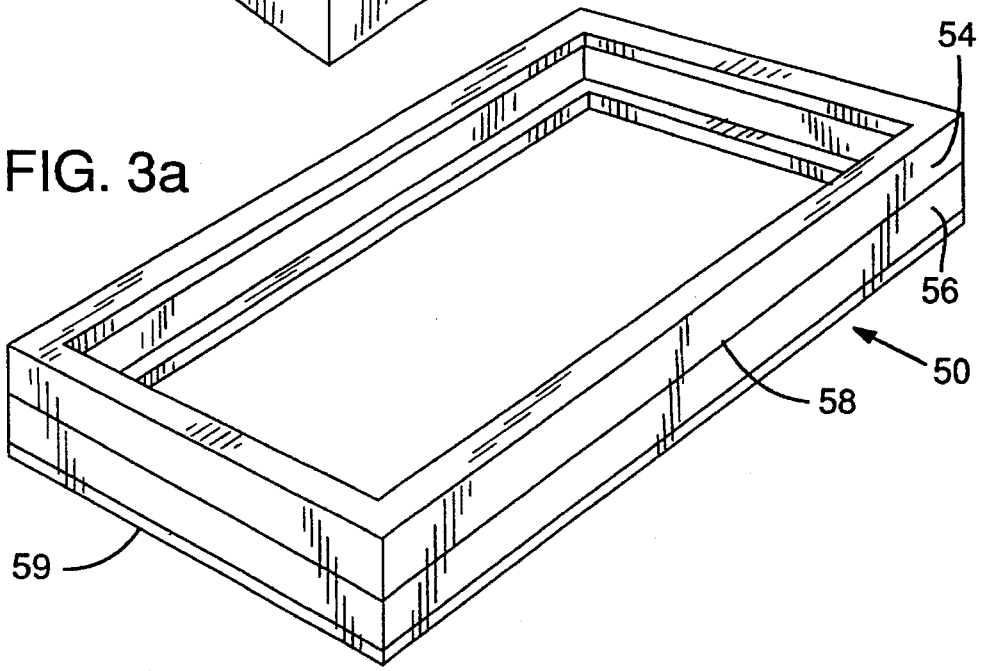
FIGS. 3a, 3b and 3c are views of forms utilized in the formation of the panels of the present invention arranged to receive the frames of FIGS. 2a and 2b.
Figure 3C:
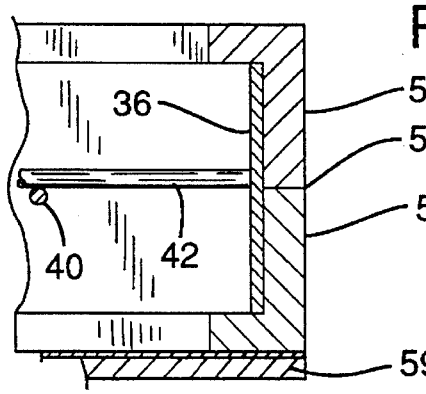
Figure 3B:
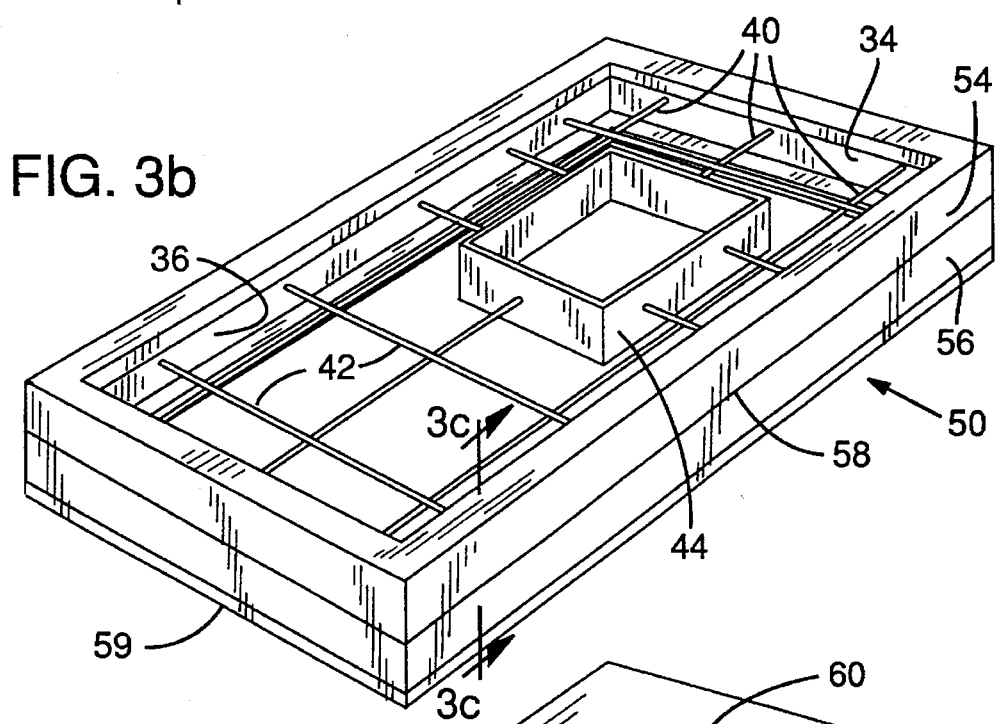

Forms are provided and constructed in a conventional manner to accommodate the frames. The forms illustrated are given as example and may be altered to suit. The forms of FIGS. 3a and 3b have an upper portion 54 and a lower portion 56. A bottom 59 is attached to the lower portion 56 and the upper portion 54 may be separated from the lower portion 56. The point of separation is indicated at 58 in FIG. 3c. The form 50, such as shown in FIGS. 3a and 3b is provided for receiving the frame 32. The form is suitably constructed so that a composite mixture of material 60, which will be later described, may be placed in the form to fill the void between the ends 34 and sides 36 of the frame 32 with the material extending beyond the height of the frame 32. The panel 30 will have the ends 34 and the sides 36 of the frame 32 exposed when the panel is finished. The form 50 illustrated in FIG. 3b is shown with the frame of FIG. 2b installed. The structure 44 of the frame 32 will provide for an opening in a panel. It will be appreciated that other sizes and configurations of openings may be provided as required.

The form 50 of FIG. 3a, having the frame 32 of FIG. 2a received therein is filled with the composite mixture of material which will be referred to as a composition 60. The composition 60 is similar in many respects to concrete. The composition 60 will set up to form a rigid, high strength member. The composition 60 without aggregate as an ingredient is relatively light in weight and weighs much less than other materials such as concrete, the composition 60 weighing on the order of 37 pounds per cubic foot as compared to approximately 160 pounds per cubic foot for concrete.

The composition 60 in this embodiment is a mixture of portland cement, a filler material which includes fines (a cellulose material in a fibrous form such as wood fiber) and a bulk material (such as wood chips), starch, aluminum sulfate (commonly known as alum) and water, preferably hot. The materials of the composition 60 are mixed together, such as by a cement mixer. The portland cement, starch, aluminum sulfate in conjunction with the water provide the binding agent to bind the filler material (wood chips and wood fiber) together as a solid unit. The starch adds to the binding qualities of the portland cement and provides other valuable properties. The starch in addition to providing additional binding capability acts as a plasticizer for the mixture, it retards the reaction or setting of the cement and acts as a swelling agent. The starch acts as a retardant to delay the reaction of the cement. The starch acting as a swelling agent is believed to be responsible for the formation of small air bubbles in the composition 60. These air bubbles provide for a high insulation value. The aluminum sulfate is added to stabilize the starch and to provide waterproofing for the composition 60. It will be appreciated that the proportion of the materials will vary somewhat, the proportions depending on the condition of the large wood chips, the wood fiber and so forth. The proportions used in this embodiment are as follows with the proportions sized so that a mixture may be made by the use of a small cement mixer.

portland cement six quarts
starch two quarts
aluminum sulfate ½ pint
hot water five gallons
large wood chips five gallon measure
wood fiber ten gallon measure The materials required for the composition 60 are mixed together to form a viscous liquid mixture. The form 50 is filled with the liquid mixture (composition 60). The wood chips and fibers, particularly if of green wood, contains a great deal of moisture. It is believed important that the composition 60 not be allowed to fully set up or totally solidify prior to removal of the majority of the moisture from the wood items. The filled form 50 is transferred to a drying kiln where it is cured and dried for a period of about seven days at 200 degrees fahrenheit. This will assure that the composition 60 has set up properly and that all excess moisture has been removed. In addition to the starch providing air bubbles, it is believed that the removal of the moisture from the cellulose filler material also aids in providing the insulating quality.

Figure 4:
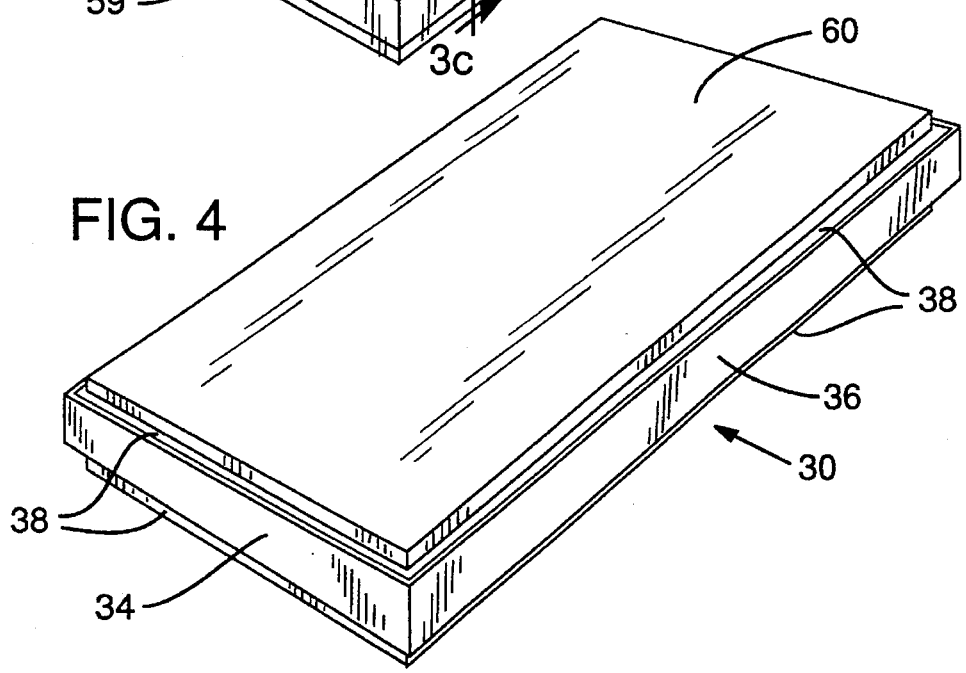
FIG. 4 is a view of one of the formed panels of the present invention.

The form 50 is removed. A panel 30 has now been formed as illustrated in FIG. 4. The panel 30 has the frame 32 extending around the periphery of the composition 60. As shown, a step 38 has been formed adjacent the edges of the ends 34 and the sides 36 of the frame 32 of the panel 30. The step 38 will facilitate the procedure for fixedly joining the panels together which will be described later.

The other panel members for the structural components, that is the panels for the foundation, the floor, the end walls and the roof are formed in the same manner. The frames and the forms are of course varied as required by the finished dimension and desired geometric shape of the panel. The form of FIG. 3b filled with the composition 60 will for example provide a panel with an opening, such as for a window.

Multiple panels are joined together to form the structural components and the structural components are in turn joined together to form the building of FIG. 1. As seen in FIG. 1 multiple panels 86 form the foundation 12, multiple panels 84 form the floor, multiple panels 82 form the end walls 16, multiple panels 30 form the side walls 18 and multiple panels 80 form the roof 20.

Figure 5:
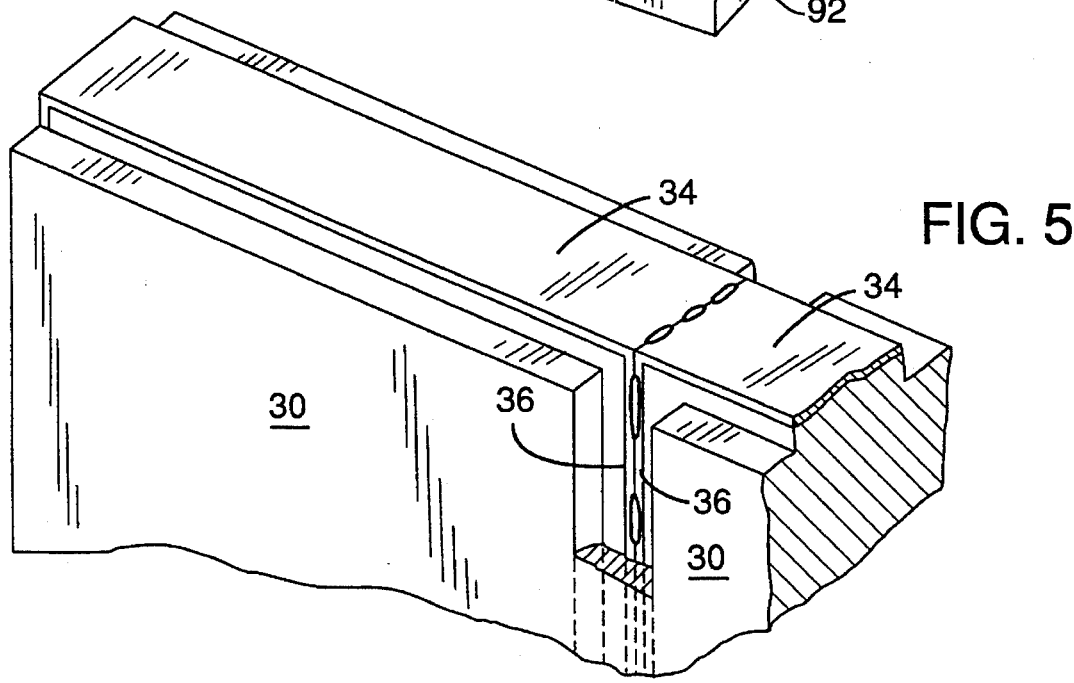
FIG. 5 is a view showing one method of joining panels of the present invention together to form a structural component.

The panels are joined together as by welding the frames of adjacent panels together. FIG. 5 illustrates a typical joining of panels 30. Two panels 30 are shown placed adjacent each other with the sides 36 of the frames 32 in abutment. The edges of the sides 36 of the frame 32 on each side of the panels 30 are joined by welding. The corners of the frames 32 adjacent each other are also welded together. The other structural members are similarly constructed by welding the frames of the panels together. After the panels have been welded together, the recesses formed by the steps 38 of the panels are filled with the composition material 60.

Referring once again to FIG. 1, a footing 90 is provided for supporting the structural components of the building 10. A steel footing plate 92 is securely anchored to the footing. The foundation panels 86 are secured to the footing plate as by welding. It will be appreciated that the foundation 12 is assembled on the footing 90 panel by panel, and the panels 86 will be joined together as by welding. The panels 86 are secured to the footing plate 92 by welding the plate 92 to the frames of the panels 86. A floor plate 94 is mounted on the top side of the foundation by welding the plate 94 to the frames of the foundation panels 86. The floor panels 84 are mounted on and secured to the floor plate 94 by welding. The floor panels 84 are also welded together and thus form the floor 14. Another floor plate 96 is fitted on the top of the floor 14 around its periphery and is secured in position by welding it to the frames of the assembled floor panels 84. The wall panels 30, 82 are placed in position relative to the floor 14, the wall panels being secured to the plate 96 (and thus the floor 14) by welding. Adjacent wall panels are in turn joined to each other as by welding. Roof panels 80 are placed on the side walls 18 and fixedly joined together by welding. One end of each roof panel 80 will have a frame configured for the pitch of the roof and the other end of the panel will be configured to fit on the side wall 18. The roof panels 80 are secured to the side walls 18 and to each other by welding. The end walls 16 are secured to the roof panels 80 at the ends of the roof 20.

The process of forming a panel and joining of the panels into structural components in the erection of a building is schematically illustrated in FIG. 6. Materials 100 are provided and in this embodiment the materials include wood chips, wood fiber, cement, starch, alum and water. The materials 100, in the proportions previously detailed, are mixed together in a mixer 102 to a viscous state to form a composition of material 60. A form 106 having a frame 104 received therein is filled with the viscous composition 60. The frame 104 is configured for the intended usage of a formed panel, such as for foundations, for walls, for floors and for roofs and the like. The form 106 is arranged to receive the configuration of the frame 104. The filled form 106 is transferred to a drying kiln 108. The form 106 filled with the composition 60 is cured in the kiln for a period of about seven days at about 200 degrees fahrenheit which solidifies the composition 60 thus forming a structural panel having a frame and a composition integrally formed. The form 106 is removed from the panel at the end of the curing process. Panels are joined together into a structural component 110 as by welding adjoining frames of the panels together. The structural components are similarly joined together to form a building, such as the building 10 of FIG. 1.

The building 10 is thus erected by assembling multiple panels. The panels form structural components of the building and each component is rigidly mounted with respect to another structural component. As previously mentioned, after the welding method has been completed, the voids provided by the step 38 in the panels is filled with the mixture 60 to finish the structural component.

The modular panels when assembled provide a building suited for finishing. The composition 60 is suited for attachment of materials required for finishing the building. The ingredients of the composition 60 permits the driving of fasteners such as nails, screws and the like. This provides for the attachment of conventional finishing materials that are available and well known in the building trade. The composition of the panels provides an adequate insulating quality without the addition of other insulating materials.

While only one panel (30) was detailed as to its formation, it will be apparent that the other panels are similarly constructed. The intended usage of the panels will determine their ultimate arrangement. The concept of panels is basic; a frame is provided that is filled with a mixture of materials that will set up and provide a structural member. The arrangement of the frame and thus the finished panel will vary depending on the design of the building to which it will be employed. The roof panels for example will vary depending on the pitch desired for the roof. The frames will be altered to suit. The openings required in any of the panels will be accommodated by the frame structure and the forms surrounding the frames. Openings are generally provided for windows, doorways and vents. It is recognized that other openings may be required such as for chimneys, plumbing and other items.

The bulk material utilized in the preferred embodiment was given as by way of example. It is recognized that other low cost materials may be substituted or added to the mixture. The mixture of the preferred embodiment utilizes renewable resources that are low in cost. The wood products of the mixture do not require that the tree variety be suited for structural lumber. It may be of a variety that is normally cast aside or ignored. The advantage of the mixture of the present invention is that it will utilize the total tree including the bark, small limbs and so forth.

It will be appreciated that there are many variations that may be made in the erection of the building 10. The method described and illustrated was given to provide but one example. The configurations of the panels may also be altered to suit the requirements. The roof 20, for example, may be formed of panels that will extend beyond the edge of the side walls 18 to provide eaves and may be formed of panels that will extend beyond the end walls 16 to provide an overhang.

The invention is therefore not to be limited to the embodiments described and illustrated but is to be determined from the appended claims.

What is claimed is:

1. A method of producing a modular structural panel for producing a building enclosure having support walls comprising the steps of:

providing a viscous water based mixture comprising cellulose fines, starch and cement and substantially no aggregate;

providing a frame configured to have opposed sides conjoined together to define a void surrounded by the opposed sides;

filling the void with the viscous mixture;

curing the mixture to a solid form, said curing being controlled at an elevated temperature over an extended time period as permitted by the starch acting as a plasticizer to thereby remove a majority of moisture from the mixture prior to solidifying the mixture in the frame, which frame and mixture are caused to become an integral modular structural panel with the mixture occupying at least the void between the opposed sides of the frame.

2. A method of producing a modular structural panel as defined in claim 1, wherein:

the mixture includes a filler of wood chips and said extended curing provides for removal of moisture from said wood chips.

3. A method of producing a modular structural panel as defined in claim 2, wherein:

the mixture is cured by subjecting it to a temperature of about 200 degrees fahrenheit for a period of about seven days.

4. A method of producing a modular structural panel as defined in claim 3, wherein:

the step of providing a frame includes providing a reinforcing member in the frame.

5. A method for producing an enclosure having load bearing walls, a roof, flooring and foundation which includes:

(a) designing the enclosure to include interconnected predetermined modular panels for the production of at least certain of said load bearing walls;

(b) producing said predetermined modular panels including the steps of:

(i) providing for each predetermined modular panel a metal frame configured to form an outline of said predetermined modular panel, said frame including conjoined opposed sides defining a void;

(ii) filling the void between the opposed sides with a water based slurry including cellular fiber, cement, starch and a non-aggregate filler;

(iii) controllably drying the slurry over an extended period of time as provided by the starch acting as a plasticizer to thereby remove a majority of moisture from the slurry and provide a non-concrete predetermined modular panel of solid form and substantially lighter weight as compared to a similar sized concrete panel, said lighter weight predetermined modular panel being surrounded by the metal frame which is exposed at side edges of the predetermined modular panel;

(c) assembling a plurality of said predetermined modular panels according to the design of step (a) by selectively abutting and connecting together the exposed metal frame side edges of the predetermined modular panels to produce said certain load bearing walls of said enclosure.

6. A method of producing an enclosure as defined in claim 5, wherein:

the panels are joined together by welding.

* * * * *